(12) United States Patent
Yang et al.

(10) Patent No.: US 11,178,106 B2
(45) Date of Patent: Nov. 16, 2021

(54) ROUTING LEVEL ACCESS CONTROL FOR TENANT VIRTUAL MACHINES IN A CLOUD NETWORKING ENVIRONMENT

(71) Applicant: International Business Machines Corporation, Armonk, NY (US)

(72) Inventors: Yi Yang, Cary, NC (US); Timothy J. Kuik, White Bear Lake, MN (US); Flavio Fernandes, Westford, MA (US); Kyle Andrew Donald Mestery, Woodbury, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 396 days.

(21) Appl. No.: 16/271,974

(22) Filed: Feb. 11, 2019

(65) Prior Publication Data

US 2020/0259789 A1   Aug. 13, 2020

(51) Int. Cl.
*H04L 29/06* (2006.01)
*G06F 9/455* (2018.01)

(52) U.S. Cl.
CPC ...... *H04L 63/0236* (2013.01); *G06F 9/45558* (2013.01); *G06F 2009/45587* (2013.01); *G06F 2009/45595* (2013.01)

(58) Field of Classification Search
CPC .............. H04L 63/0236; G06F 9/4558; G06F 2009/45587; G06F 2009/45595
USPC ......................................................... 726/13
See application file for complete search history.

(56) References Cited

U.S. PATENT DOCUMENTS

| | | | |
|---|---|---|---|
| 8,539,582 B1 * | 9/2013 | Aziz | G06F 9/45558 726/24 |
| 9,544,248 B2 | 1/2017 | Banavalikar et al. | |
| 9,722,857 B2 | 8/2017 | Liu | |
| 9,942,142 B2 | 4/2018 | Silva et al. | |
| 9,942,278 B2 | 4/2018 | Shimakawa | |
| 9,942,766 B1 | 4/2018 | Bonn et al. | |
| 2016/0092254 A1 * | 3/2016 | Borra | G06Q 20/14 718/1 |
| 2020/0228571 A1 * | 7/2020 | Aharchaou | H04L 63/104 |

OTHER PUBLICATIONS

Mohan, Network Policy and Istio: Deep Dive, May 24, 2017.

* cited by examiner

*Primary Examiner* — Michael S McNally
(74) *Attorney, Agent, or Firm* — Garg Law Firm, PLLC; Rakesh Garg; Michael O'Keefe

(57) ABSTRACT

A first security policy associated with a first tenant in a multi-tenant hosting data processing environment is created. A first virtual machine is caused to execute on a first host, the first virtual machine associated with a first group defined by the first security policy. A controller is caused to send, from the controller to an agent executing on the first host, authorized communication information, the authorized communication information specifying a set of virtual machines associated with the first group. The agent is caused to configure a second routing entry in the first host, the second routing entry derived from the authorized communication information, the second routing entry causing the first virtual machine to reject outgoing network traffic intended for a second IP address, the second IP address associated with a third virtual machine outside the first group.

19 Claims, 11 Drawing Sheets

ROUTING LEVEL ACCESS CONTROL FOR TENANT VIRTUAL MACHINES IN A CLOUD NETWORKING ENVIRONMENT

TECHNICAL FIELD

The present invention relates generally to a method, system, and computer program product for access control in a cloud networking environment. More particularly, the present invention relates to a method, system, and computer program product for routing level access control for tenant virtual machines in a cloud networking environment.

BACKGROUND

A virtual machine (VM) comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host.

For example, the host may include a processor component. One virtual representation of the processor can be assigned to one VM, and another virtual representation of the same processor can be assigned to another VM, both VMs executing on the host. Furthermore, the second VM may also have access to a virtual representation of a reserve processor in the host and certain other resources, either exclusively or in a shared manner with the first VM.

Certain data processing systems are configured to process several workloads simultaneously. For example, separate virtual data processing systems, such as separate VMs, configured on a single host data processing system often process separate workloads for different clients or applications.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

VMs are installed or created on a compute node as needed for processing workloads, meeting service level requirements, and many other reasons. Furthermore, different configurations of VMs may be needed for different purposes. For example, when a VM is created just for providing a user a general purpose computing platform, the VM may be created only with the basic operating system and no applications. In another example, when a new VM has to provide application services, the VM may be created with an operating system and an application server configured thereon. Similarly, many different configurations of VMs may be created for a variety of other purposes.

Thus multiple virtual machines can share the same physical resources, and software running on the virtual machine does not need to be aware of changes in the underlying physical hardware, such as when cloud computing resources in a datacenter are provisioned, removed, or reallocated. A tenant virtual machine, as used herein, refers to a virtual machine running in a virtualized environment under the administrative control of a tenant, account holder or subscriber. VMs belonging to same tenant may be located on the same or different hosts, and one host machine can host VMs belonging to the same or different tenants.

SUMMARY

The illustrative embodiments provide a method, system, and computer program product. An embodiment includes a method that creating a first security policy associated with a first tenant in a multi-tenant hosting data processing environment. An embodiment causes a first virtual machine to execute on a first host, the first virtual machine associated with a first group defined by the first security policy. An embodiment causes a controller to send, from the controller to an agent executing on the first host, authorized communication information, the authorized communication information specifying a set of virtual machines associated with the first group. An embodiment causes the agent to configure a second routing entry in the first host, the second routing entry derived from the authorized communication information, the second routing entry causing the first virtual machine to reject outgoing network traffic intended for a second IP address, the second IP address associated with a third virtual machine outside the first group.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
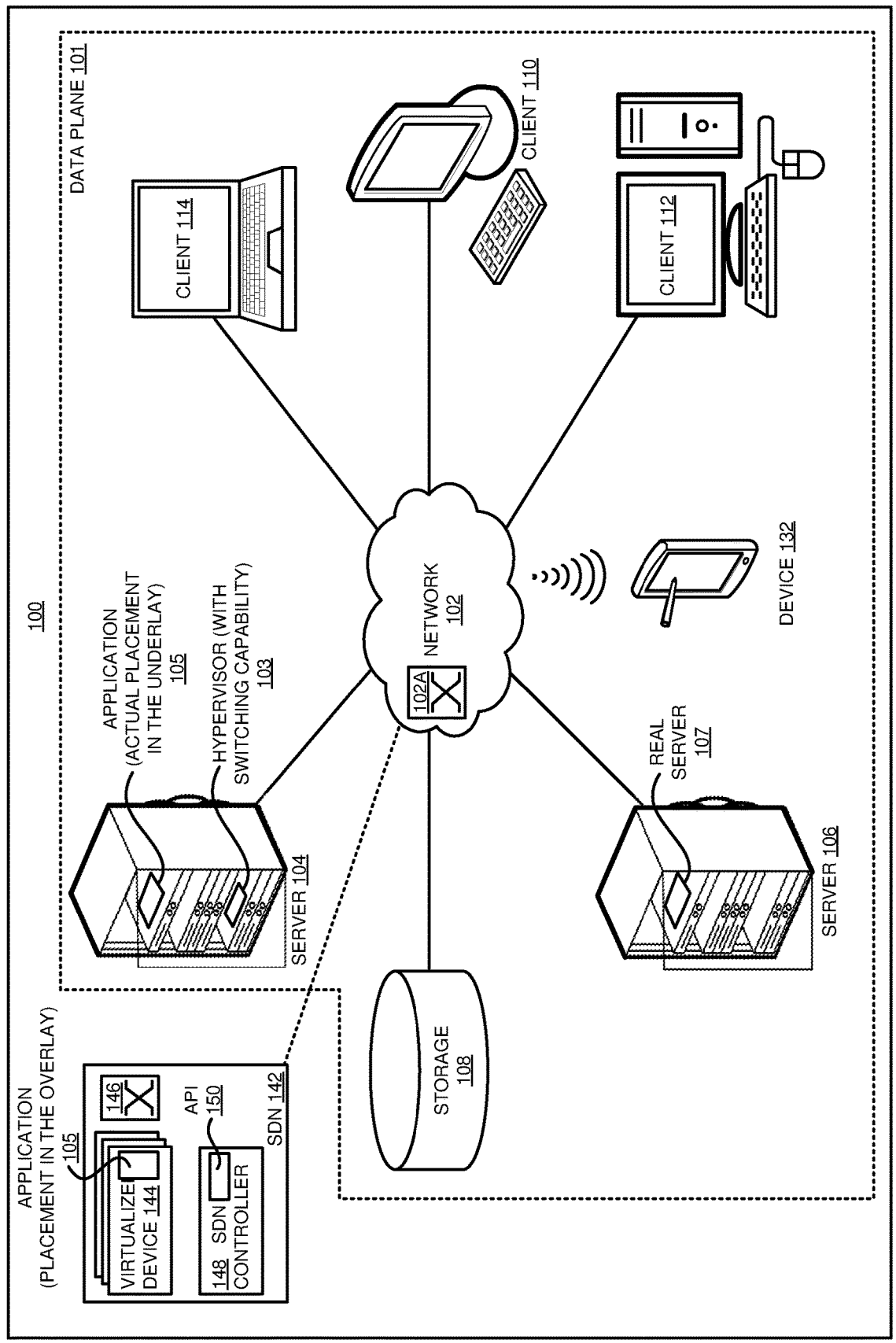
FIG. 1 depicts a block diagram of a network of data processing systems in which illustrative embodiments may be implemented.

The illustrative embodiments recognize that in multi-tenant cloud computing environments, each tenant expects that its traffic will be kept separate from other tenants, for security and privacy reasons. Even within a tenant, an administrator may want to restrict which VMs may communicate with which other VMS, or ensure that only certain authorized applications can access a specific service.

The illustrative embodiments also recognize that traffic routing between VMs is usually implemented at one level of a network configuration stack, while security restricting traffic between VMs and between applications is usually implemented at another level of a network configuration stack. As used herein, an overlay network is a computer network that is built on top of another network, also called an underlay network Techniques are available presently to construct a logical network, also known as a software defined network (SDN) overlay (hereinafter interchangeably, "SDN" or "overlay"), from networking components. Essentially, networking components are abstracted into corresponding logical or virtual representations, and the abstractions are used to define the SDN. In other words, an SDN is a logical network formed and operated using logical representations of the underlying physical components.

Physical networks usually exist within the demarcated boundary of the data processing environment whose physical components are utilized in the physical network. Unlike a physical network, an SDN can be designed to span across one or more data processing environments. For example, while a physical network may be contained within a datacenter, an SDN may span across one or more datacenters.

As an example, a logical representation of a hypervisor can participate in an SDN, such that a function attributed to the logical representation of the hypervisor in the SDN is actually performed by the underlying hypervisor component in the underlay. Similarly, a logical representation of a switch or a networking gateway can participate in an SDN, such that a function attributed to the logical representation of the switch or the networking gateway in the SDN is actually performed by the underlying switch or the networking gateway component, respectively, in the underlay.

One example of an overlay network implementation is a Virtual Extensible Local Area Network (VxLAN) implementation. In a VxLAN implementation, a VxLAN Tunnel End Point (VTEP) is the IP address which defines the source or destination of an encapsulated tunnel between hosts. A VTEP can reside on a physical or virtual switch (vSwitch) of a host. Traffic routing between VMs can be configured using a routing protocol such as Border Gateway Protocol-Ethernet Virtual Private Network (BGP-EVPN) at each VTEP, or configured at each vSwitch using a configuration protocol such as Open vSwitch Database Management Protocol (OVSDB). At another level of a network configuration stack, a security group is a set of Internet Protocol (IP) filter rules that define how to handle incoming and outgoing traffic to a VM. Security groups are implemented on the hypervisor hosting each VM.

The illustrative embodiments recognize that because routing and security are implemented separately, inefficiencies and lack of scalability result. Typically, routing between VMs of one tenant is configured in a full mesh implementation, in which every VM can communicate with every other VM. As cloud computing infrastructures of hundreds or thousands, or even millions of VMs become more common, the number of tunnels between VMs grows exponentially. However, the illustrative embodiments recognize that not every VM may need to or should be able to communicate with every other VM—but unneeded links must be set up and maintained regardless under the present method of configuring a tenant's overlay network. In addition, the illustrative embodiments recognize that a VM may send traffic to another VM because such traffic is allowed at the vSwitch or VTEP level, only to have the traffic dropped at the destination as a security policy enforces disallowed traffic. The illustrative embodiments recognize that this unneeded traffic wastes network bandwidth that could be used for allowed traffic and permits denial of service attacks using large amounts of such unneeded traffic. As well, the necessity for the destination security policy to inspect incoming traffic to determine what is allowed adds to network latency. In rule-based implementation of a security policy, the longer the list of rules, the more time is required to inspect and allow incoming traffic. Further, administering a network configured using two separate implementations and configuration mechanisms is more difficult to understand, maintain, and enforce desired security.

Consequently, the illustrative embodiments recognize that there is a need for a combined routing and security implementation, especially in a multi-tenant cloud environment at larger scales. Such an implementation blocks disallowed traffic at the source, rather than the destination, of the traffic, so that disallowed traffic is not sent.

The illustrative embodiments recognize that the presently available tools or solutions do not address these needs or provide adequate solutions for these needs. The illustrative embodiments used to describe the invention generally address and solve the above-described problems and other problems related to routing level access control for tenant virtual machines in a cloud networking environment.

An embodiment can be implemented as a software application. The application implementing an embodiment can be configured as a modification of a controller within an existing cloud networking system, as a separate application that operates in conjunction with a controller within an existing cloud networking system, a standalone application, or some combination thereof.

Particularly, some illustrative embodiments provide a method by which centrally-managed routing table entries, sent to and implemented in virtual machines, can be configured to allow or reject outgoing network traffic.

An embodiment is implemented within a controller. As used herein, a controller does not transport data traffic, but instead instructs other units to transport traffic. A controller can be implemented as an appliance, a cluster of nodes, a VM, a host, a container, or a multiple of these elements. Another embodiment is implemented elsewhere, but causes a controller to issue appropriate data to other units within a network.

An embodiment makes use of additional functionality of hosts. Virtual machines, as discussed herein, run on hosts. A host includes network interface functionality. In particular, a VM communicates with other VMs on other hosts using a vSwitch, VTEP, a combination of a vSwitch and VTEP, or using another type of network interface functionality. A host also includes an agent application. An agent application, also referred to herein as an agent, communicates with a controller to configure the host, or a VM or network interface function running on the host. In one embodiment a controller includes an agent interface module to communicate with an agent running on a host of the network to issue appropriate data to the host. In one embodiment, a controller and agent communicate with each other via an Application Programming Interface (API).

An embodiment creates a tenant account. An embodiment also creates a security policy. A security policy defines a set of virtual machines, associated with a tenant account, that are allowed to communicate with each other over an overlay network. A security policy is also configurable to define a set of ports of virtual machines that are allowed to communicate with each other over an overlay network.

An embodiment configures a VM within a group of VMs that are allowed to communicate with each other according to a security policy and causes the VM to execute on a host. As part of the VM configuration process, an embodiment causes a controller to send authorized communication information to an agent executing on the host or VM being configured.

In one embodiment, the authorized communications information is an entry in a routing table. An entry in a routing table is also referred to as an routing entry. An agent inserts the received routing entry into an existing routing table of a host, vSwitch, physical switch, or VM. The routing entry instructs the host, vSwitch, physical switch, or VM to send traffic only from one allowed IP address to another allowed IP address, how to reach the allowed IP address, and to refuse to send traffic from an allowed IP address to other, disallowed IP addresses. Alternatively, the routing entry instructs the host, vSwitch, physical switch, or VM to send traffic only from a port, or a set of ports, of one allowed IP address to a port, or a set of ports, of another allowed IP address, how to reach the allowed IP address and port(s), and to refuse to send traffic from a port, or a set of ports, of an allowed IP address to other, disallowed ports or a set of ports on disallowed IP addresses.

For example, suppose VM1 is configured and caused to execute on Host 1, which has an IP address of 10.1.1.11. VM1 is assigned an IP address of 192.168.3.3. All IP addresses cited herein are only examples, and not to be construed as limiting. IP addresses may have any value, and be in IPv4, IPv6, or any other suitable format. At the moment, VM1 is the only VM in the group defined by a security policy, and VM1 should not be sending traffic to any other VMs. Thus, an embodiment causes a controller to instruct the agent on Host 1 to configure a default drop-all routing entry to prevent unauthorized traffic: ip_source=192.168.3.3, ip_destination=any, action=>drop.

Next, suppose VM2 is configured and caused to execute on Host 2, which has an IP address of 10.2.1.12. VM2 is assigned an IP address of 192.168.5.5. According to a security policy, VM2 should be allowed to communicate with existing VM1. Thus, an embodiment causes a controller to instruct the agent on Host 2 to configure two routing entries. The first routing entry is: ip_source=192.168.5.5, ip_destination=192.168.3.3, action=>vxlan (source=10.2.1.12, destination=10.1.1.11). This routing entry indicates that packets should be encapsulated in VxLAN format, and that traffic is to be sent from VM2 to VM1 through a tunnel from Host 2 to Host 1. In addition, an embodiment causes a controller to instruct the agent on Host 2 to configure a second, default drop-all routing entry to prevent unauthorized traffic: ip_source=192.168.5.5, ip_destination=any, action=>drop. Routing entries are processed in order, so that traffic not matching the first entry will match, and be dropped by, the second entry. In addition, Host 1 must now be configured to allow traffic from VM1 to VM2. To do this, an embodiment causes a controller to instruct the agent on Host 1 to configure an additional routing entry before the default entry: ip_source=192.168.3.3, ip_destination=192.168.5.5, action=>vxlan(source=10.1.1.11, destination=10.2.1.12). This routing entry allows traffic to be sent from VM1 to VM2 over the VxLAN overlay between Host 1 and Host 2.

Next, suppose VM3 is configured and caused to execute on Host 3, which has an IP address of 10.3.1.13. VM3 is assigned an IP address of 192.168.4.4. According to a security policy, VM3 should be allowed to communicate with existing VM2, but not with existing VM1. Thus, an embodiment causes a controller to instruct the agent on Host 3 to configure two routing entries. The first routing entry is: ip_source=192.168.4.4, ip_destination=192.168.5.5, action=>vxlan(source=10.3.1.13, destination=10.2.1.12). This routing entry allows traffic to be sent from VM3 to VM2 over the VxLAN overlay between Host 3 and Host 2. In addition, an embodiment causes a controller to instruct the agent on Host 3 to configure a second, default drop-all routing entry to prevent unauthorized traffic: ip_source=192.168.4.4, ip_destination=any, action=>drop. In addition, Host 2 must now be configured to allow traffic from VM2 to VM3. To do this, an embodiment causes a controller to instruct the agent on Host 2 to configure an additional routing entry before the default entry: ip_source=192.168.5.5, ip_destination=192.168.4.4, action=>vxlan(source=10.2.1.12, destination=10.3.1.13). This routing entry allows traffic to be sent from VM2 to VM3 over the VxLAN overlay between Host 2 and Host 3. However, because VM3 should not communicate with VM1, no update to the routing entries of VM1 is required. Traffic from VM3 to VM1 will be dropped according to the default entry on Host 3, and traffic from VM1 to VM3 will be dropped according to the default entry on Host 1.

In another embodiment, instead of causing a controller to send a routing entry, an embodiment causes a controller to broadcast the authorized communications information specifying which VMs, or ports on VMs, may communicate with which other VMs. From the broadcast information, an agent formulates one or more corresponding routing entries in a manner described herein and implements the routing entries within the agent's corresponding host, vSwitch, physical switch, or VM.

The manner of routing level access control for tenant virtual machines in a cloud networking environment described herein is unavailable in the presently available methods in the technological field of endeavor pertaining to tenant virtual machines in a cloud networking environment. A method of an embodiment described herein, when implemented to execute on a device or data processing system, comprises substantial advancement of the functionality of that device or data processing system in causing authorized communication information to be converted to routing table entries implemented within a virtual machine to allow or reject outgoing network traffic at the IP address or port level.

The illustrative embodiments are described with respect to certain types of VMs, hosts, ports, vSwitches, VTEPs, overlay networks, underlay networks, controllers, agents, network interfaces, routing table entries, groups, policies, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
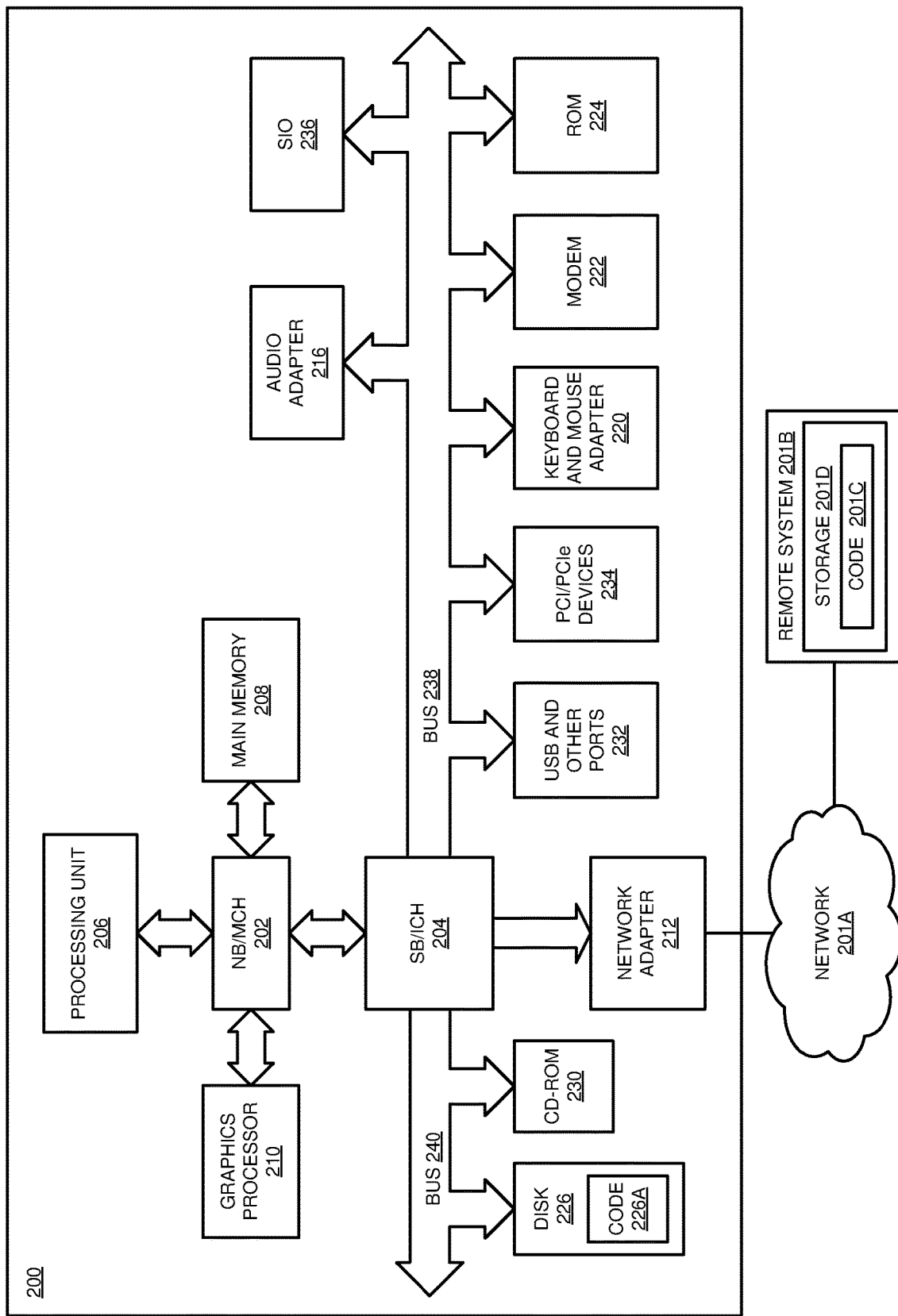
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Network 102 and the resources connected thereto forms data plane 101 over which SDN 142 is overlaid. Data plane 101 includes data processing system components, such as hypervisor 103, and physical networking components, such as switch 102A. SDN 142 implements virtual representations of one or more computing machines, such as virtualized device 144 which uses all or a portion of underlying server 104. Virtualized device 144 is a network virtualization edge (NVE). SDN 142 implements virtual representations of a networking components, such as switch 146, which is a virtualized representation of physical switch 102A. SDN 142 operates SDN controller 146 for one tenant's NVE. SDN controller 146 implements a set of application programming interface (API) 150. Application 105 implements an embodiment described herein. Particularly, application 105 configured to operate in edge 144 is actually executed as application 105 on server 104 in data plane 101. A packet is received in the tenant's NVE, which includes edge 144. Application 105 in edge 144 causes the load-balancing to occur in the NVE as described herein, and the packet is transmitted to selected real server in a computing machine, such as to real server 107 in server 106.

Servers 104 and 106, storage unit 108, and clients 110, 112, and 114, and controller 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
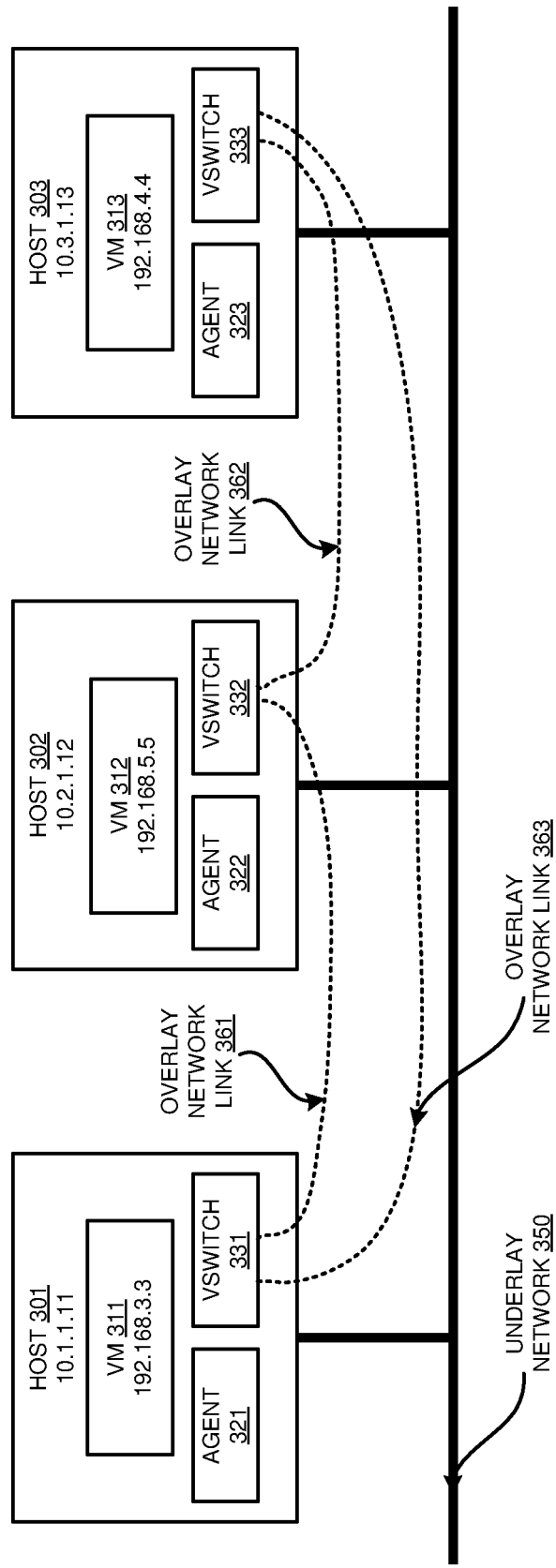
FIG. 3 depicts a block diagram of an example network configuration for tenant virtual machines in a cloud networking environment, in accordance with prior art.

With reference to FIG. 3, this figure depicts a block diagram of an example network configuration for tenant virtual machines in a cloud networking environment, in accordance with prior art. Underlay network 350 is an example of network 102 in FIG. 1, and hosts 301, 302, and 303 are examples of server 104 in FIG. 1.

FIG. 3 depicts three hosts connected by underlay network 350. Host 301 has an IP address of 10.1.1.11. VM 311 executes on host 301, and has an IP address of 192.168.3.3. Host 301 also includes agent 321 and vSwitch 331. Host 302 has an IP address of 10.2.1.12. VM 312 executes on host 302, and has an IP address of 192.168.5.5. Host 302 also includes agent 322 and vSwitch 332. Host 303 has an IP address of 10.3.1.13. VM 313 executes on host 303, and has an IP address of 192.168.4.4. Host 303 also includes agent 323 and vSwitch 333. VM 311 and VM 312 communicate through vSwitch 331 and vSwitch 332 via overlay network link 361. VM 312 and VM 313 communicate through vSwitch 332 and vSwitch 333 via overlay network link 362. VM 311 and VM 313 communicate through vSwitch 331 and vSwitch 333 via overlay network link 363. Note that overlay network links 361, 362, and 363 constitute a full mesh network, with links connecting each of VM 311, 312, and 313.

Figure 4:
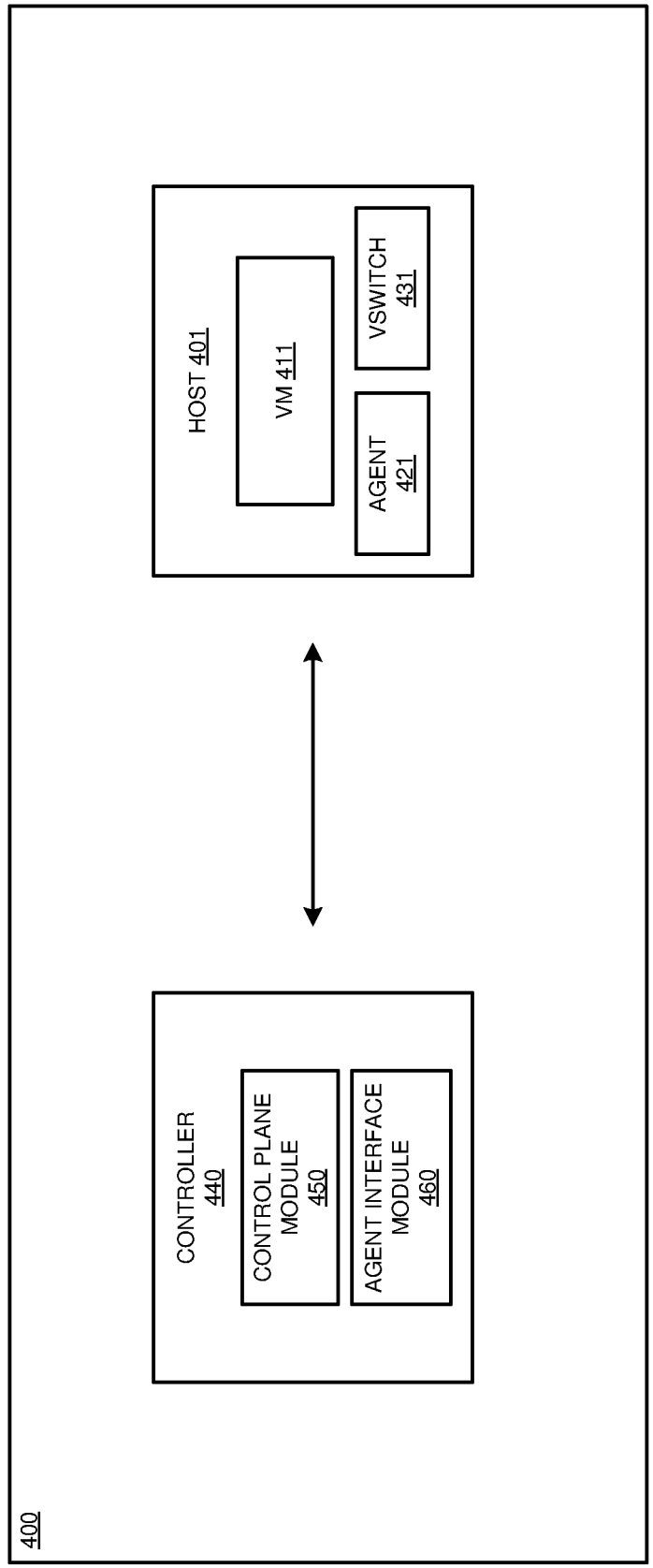
FIG. 4 depicts a block diagram of an example configuration for routing level access control for tenant virtual machines in a cloud networking environment in accordance with an illustrative embodiment.

With reference to FIG. 4, this figure depicts a block diagram of an example configuration for routing level access control for tenant virtual machines in a cloud networking environment in accordance with an illustrative embodiment. Controller 440 is an example of controller 132 in FIG. 1. Host 401 is an example of server 104 in FIG. 1.

Application 400 includes elements implemented within controller 440 and host 401. Here, controller 440 includes control plane module 450 and agent interface module 460; control plane module 450 can also be located outside controller 440, or a portion of module 450 can be located inside controller 440 and a portion of module 450 can also be located outside controller 440.

Control plane module 450 creates and maintains a security policy defining a set of virtual machines, associated with a tenant account, that are allowed to communicate with each other over an overlay network. A security policy is also configurable to define a set of ports of virtual machines that are allowed to communicate with each other over an overlay network. Control plane module 450 is also responsible for maintaining authorized communication information, including routing entries, for virtual machines and ports on virtual machines. Control plane module 450 also maintains the overlay network routing resolution, i.e., mapping between a VM and its host.

Agent interface module 460 communicates authorized communication information, including routing entries, with agent 421 on host 401. Host 401 also includes VM 411 and vSwitch 431. vSwitch 431 may also be a VTEP, or a combination of a vSwitch and a VTEP, with no loss of generality.

Figure 5:
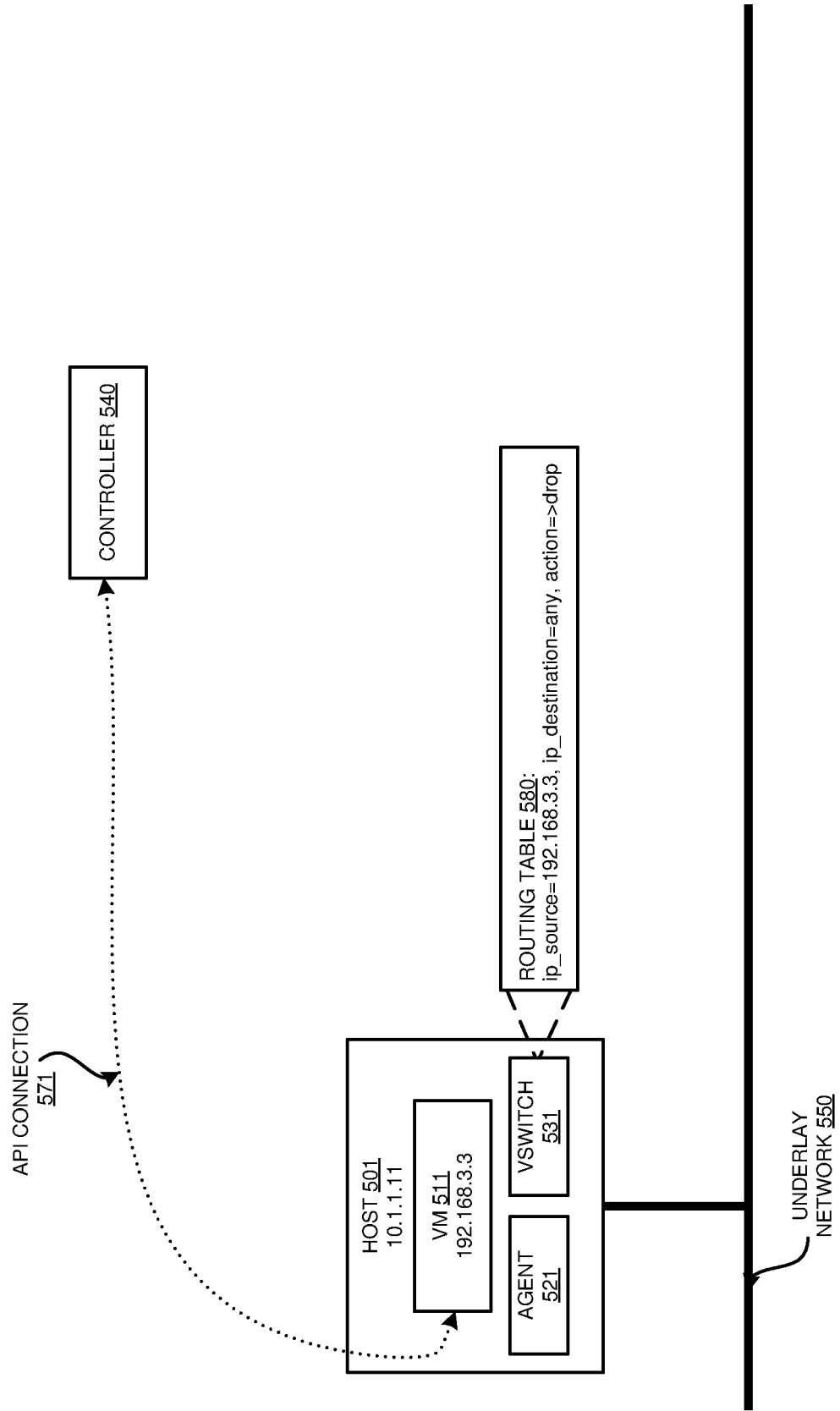
FIG. 5 depicts an example of routing level access control for tenant virtual machines in a cloud networking environment in accordance with an illustrative embodiment.

With reference to FIG. 5, this figure depicts an example of routing level access control for tenant virtual machines in a cloud networking environment in accordance with an illustrative embodiment. Controller 540 is an example of controller 440 in FIG. 4. Host 501, VM 511, agent 521, and vSwitch 531 are examples, respectively, of host 401, VM 411, agent 421, and vSwitch 431 in FIG. 4.

Controller 540 communicates with agent 521 via API connection 571. Host 501 communicates with other hosts (not shown) via underlay network 550.

Host 501 has an IP address of 10.1.1.11. VM 511 is configured, caused to execute on host 501, and assigned an IP address of 192.168.3.3. At the moment, VM 511 is the only VM in the group defined by a security policy, and VM 511 should not be sending traffic to any other VMs. Thus, controller 540 instructs agent 521 to configure a default drop-all routing entry to prevent unauthorized traffic: ip_source=192.168.3.3, ip_destination=any, action=>drop.

Figure 6:
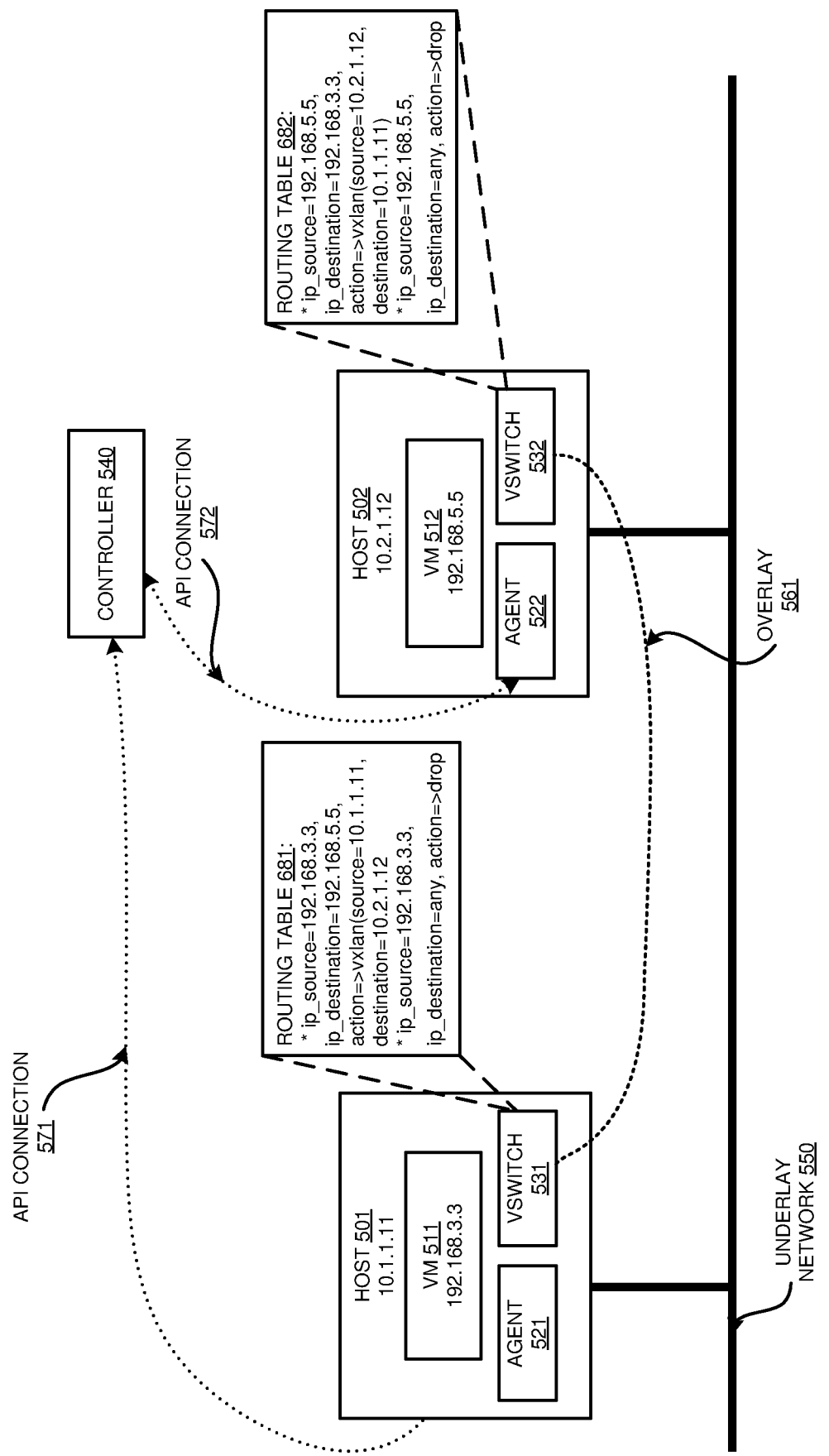
FIG. 6 depicts a continuation of an example of routing level access control for tenant virtual machines in a cloud networking environment in accordance with an illustrative embodiment.

With reference to FIG. 6, this figure depicts a continuation of an example of routing level access control for tenant virtual machines in a cloud networking environment in accordance with an illustrative embodiment. Controller 540, host 501, VM 511, agent 521, vSwitch 531, underlay network 550, and API connection 571 are the same as controller 540, host 501, VM 511, agent 521, vSwitch 531, underlay network 550, and API connection 571 in FIG. 5. Host 502, VM 512, agent 522, and vSwitch 532 are examples, respectively, of host 401, VM 411, agent 421, and vSwitch 431 in FIG. 4.

Controller 540 communicates with agent 522 via API connection 572. Hosts 501 and 502 communicate with each other via underlay network 550.

Host 502 has an IP address of 10.2.1.12. VM 512 is configured, caused to execute on host 502, and assigned an IP address of 192.168.5.5. According to a security policy, VM 512 should be allowed to communicate with existing VM 511. Thus, controller 540 instructs agent 522 to configure two routing entries in routing table 682. The first routing entry is: ip_source=192.168.5.5, ip_destination=192.168.3.3, action=>vxlan(source=10.2.1.12, destination=10.1.1.11). This routing entry allows traffic to be sent from VM 512 to VM 511 over overlay 561 between vSwitch 532 and vSwitch 531. In addition, controller 540 instructs agent 522 to configure a second, default drop-all routing entry to prevent unauthorized traffic: ip_source=192.168.5.5, ip_destination=any, action=>drop. Routing entries are processed in order, so that traffic not matching the first entry will match, and be dropped by, the second entry. In addition, host 501 must now be configured to allow traffic from VM 511 to VM 512. To do this, controller 540 instructs agent 521 to form routing table 681, configuring an additional routing entry before the existing default entry: ip_source=192.168.3.3, ip_destination=192.168.5.5, action=>vxlan(source=10.1.1.11, destination=10.2.1.12). This routing entry allows traffic to be sent from VM 511 to VM 512 over overlay 561.

Figure 7:
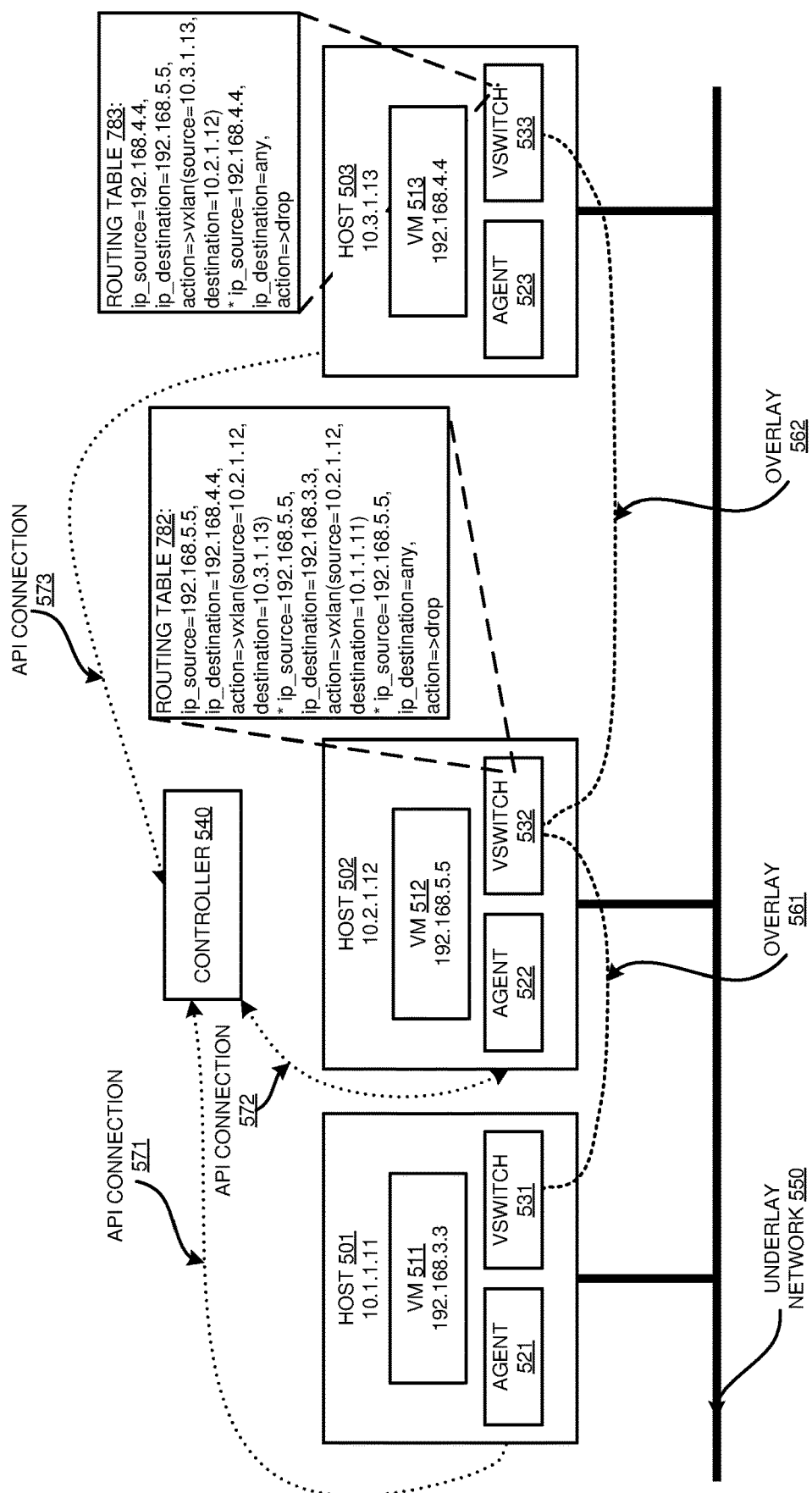
FIG. 7 depicts a further continuation of an example of routing level access control for tenant virtual machines in a cloud networking environment in accordance with an illustrative embodiment.

With reference to FIG. 7, this figure depicts a further continuation of an example of routing level access control for tenant virtual machines in a cloud networking environment in accordance with an illustrative embodiment. Controller 540, host 501, VM 511, agent 521, vSwitch 531, underlay network 550, API connection 571, host 502, VM 512, agent 522, vSwitch 532, underlay network 550, overlay 561, and API connection 572 are the same as controller 540, host 501, VM 511, agent 521, vSwitch 531, underlay network 550, API connection 571, host 502, VM 512, agent 522, vSwitch 532, underlay network 550, overlay 561, and API connection 572 in FIG. 6. Host 503, VM 513, agent 523, and vSwitch 533 are examples, respectively, of host 401, VM 411, agent 421, and vSwitch 431 in FIG. 4.

Controller 540 communicates with agent 523 via API connection 573. Host 503 communicates with other hosts via underlay network 550.

Host 503 has an IP address of 10.3.1.13. VM 513 is configured, caused to execute on host 503, and assigned an IP address of 192.168.4.4. According to a security policy, VM 513 should be allowed to communicate with existing VM 512, but not with existing VM 511. Thus, controller 540 instructs agent 523 to configure two routing entries in routing table 783. The first routing entry is: ip_source=192.168.4.4, ip_destination=192.168.5.5, action=>vxlan(source=10.3.1.13, destination=10.2.1.12). This routing entry allows traffic to be sent from VM 513 to VM 512 over overlay 562. In addition, controller 540 instructs agent 523 to configure a second, default drop-all routing entry to prevent unauthorized traffic: ip_source=192.168.4.4, ip_destination=any, action=>drop. In addition, host 502 must now be configured to allow traffic from VM 512 to VM 513. To do this, controller 540 instructs agent 522 to form routing table 782, configuring an additional routing entry before the existing default entry: ip_source=192.168.5.5, ip_destination=192.168.4.4, action=>vxlan(source=10.2.1.12, destination=10.3.1.13). This routing entry allows traffic to be sent from VM 512 to VM 513 over overlay 562. However, because VM 513 should not communicate with VM 511, no update to the routing entries in routing table 681 is required. Traffic from VM 513 to VM 511 will be dropped according to the default entry in routing table 783, and traffic from VM 511 to VM 513 will be dropped according to the default entry in routing table 681.

Figure 8:
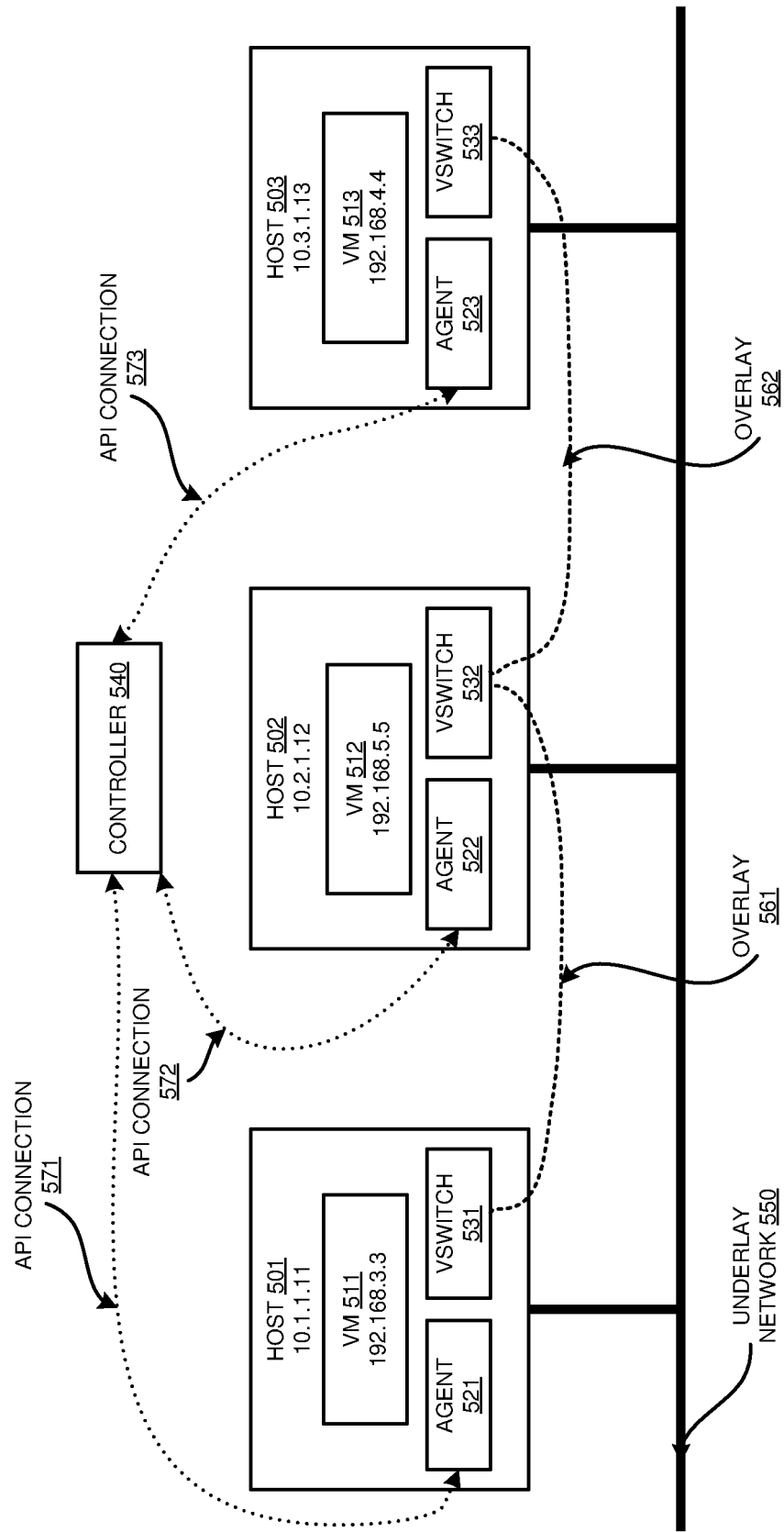
FIG. 8 depicts a result of an example of routing level access control for tenant virtual machines in a cloud networking environment in accordance with an illustrative embodiment.

With reference to FIG. 8, this figure depicts a result of an example of routing level access control for tenant virtual machines in a cloud networking environment in accordance with an illustrative embodiment. Controller 540, hosts 501, 502, and 503, VMs 511, 512, and 513, agents 521, 522, and 523, vSwitches 531, 532, and 533, underlay network 550, overlays 561 and 562, and API connections 571, 572, and 573 are the same as controller 540, hosts 501, 502, and 503, VMs 511, 512, and 513, agents 521, 522, and 523, vSwitches 531, 532, and 533, underlay network 550, overlays 561 and 562, and API connections 571, 572, and 573 in FIG. 7.

Here, according to a security policy, VM 511 and VM 512 can communicate with each other via overlay 561. VM 512 and VM 513 can communicate with each other via overlay 562. However, the routing table entries prevent VM 511 from sending traffic to VM 513, and prevent VM 513 from sending traffic to VM 511.

Figure 9:
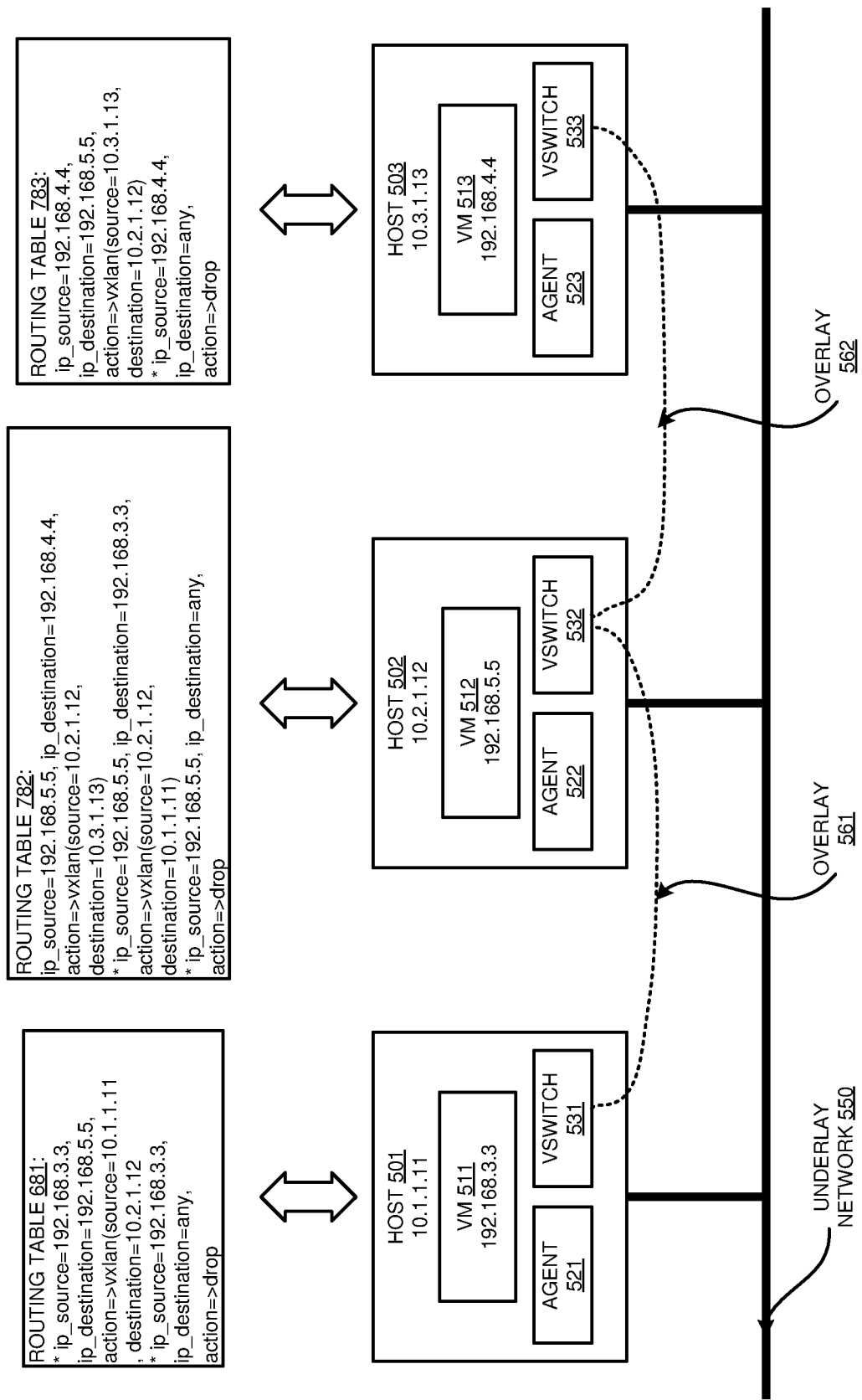
FIG. 9 depicts a further view of a result of an example of routing level access control for tenant virtual machines in a cloud networking environment in accordance with an illustrative embodiment.

With reference to FIG. 9, this figure depicts a further view of a result of an example of routing level access control for tenant virtual machines in a cloud networking environment in accordance with an illustrative embodiment. Hosts 501, 502, and 503, VMs 511, 512, and 513, agents 521, 522, and 523, vSwitches 531, 532, and 533, underlay network 550, overlays 561 and 562, and API connections 571, 572, and 573, are the same as hosts 501, 502, and 503, VMs 511, 512, and 513, agents 521, 522, and 523, vSwitches 531, 532, and 533, underlay network 550, overlays 561 and 562, and API connections 571, 572, and 573 in FIG. 7. Routing table 681 is the same as routing table 681 in FIG. 6. Routing tables 782 and 783 are the same as routing tables 782 and 783 in FIG. 7.

Here, according to a routing entry implemented in routing tables 681 and 782, VM 511 and VM 512 can communicate with each other via overlay 561. According to entries implemented in routing tables 782 and 783, VM 512 and VM 513 can communicate with each other via overlay 562. However, entries in routing tables 681 and 783 prevent VM 511 from sending traffic to VM 513, and prevent VM 513 from sending traffic to VM 511.

Figure 10:
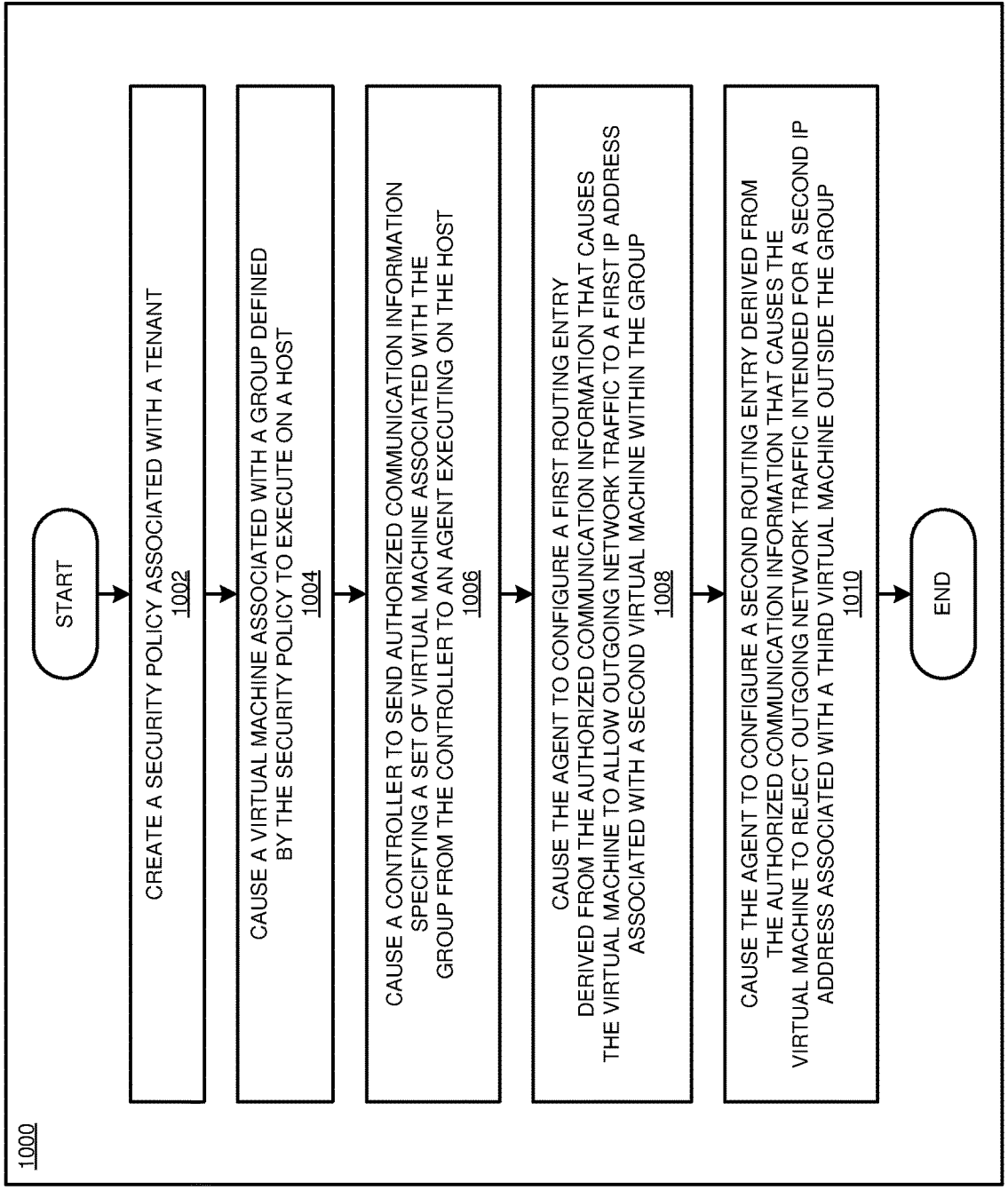
FIG. 10 depicts a flowchart of an example process for routing level access control for tenant virtual machines in a cloud networking environment in accordance with an illustrative embodiment.

With reference to FIG. 10, this figure depicts a flowchart of an example process for routing level access control for tenant virtual machines in a cloud networking environment in accordance with an illustrative embodiment. Process 1000 can be implemented in application 400 in FIG. 4.

In block 1002, the application creates a security policy associated with a tenant. In block 1004, the application causes a virtual machine associated with a group defined by the security policy to execute on a host. In block 1006, the application causes a controller to send authorized communication information specifying a set of virtual machines associated with the group from the controller to an agent executing on the host. In block 1008, the application causes the agent to configure a first routing entry, derived from the authorized communication information, in the host, vSwitch, physical switch, or virtual machine, that causes the virtual machine to allow outgoing network traffic intended for a first IP address associated with a second virtual machine within the group, as permitted by the security policy. In block 1010, the application causes the agent to configure a second routing entry, derived from the authorized communication information, in the host, vSwitch, physical switch, or virtual machine, that causes the virtual machine to reject outgoing network traffic intended for a second IP address associated with a third virtual machine outside the group, as not permitted by the security policy. Then the application ends.

Figure 11:
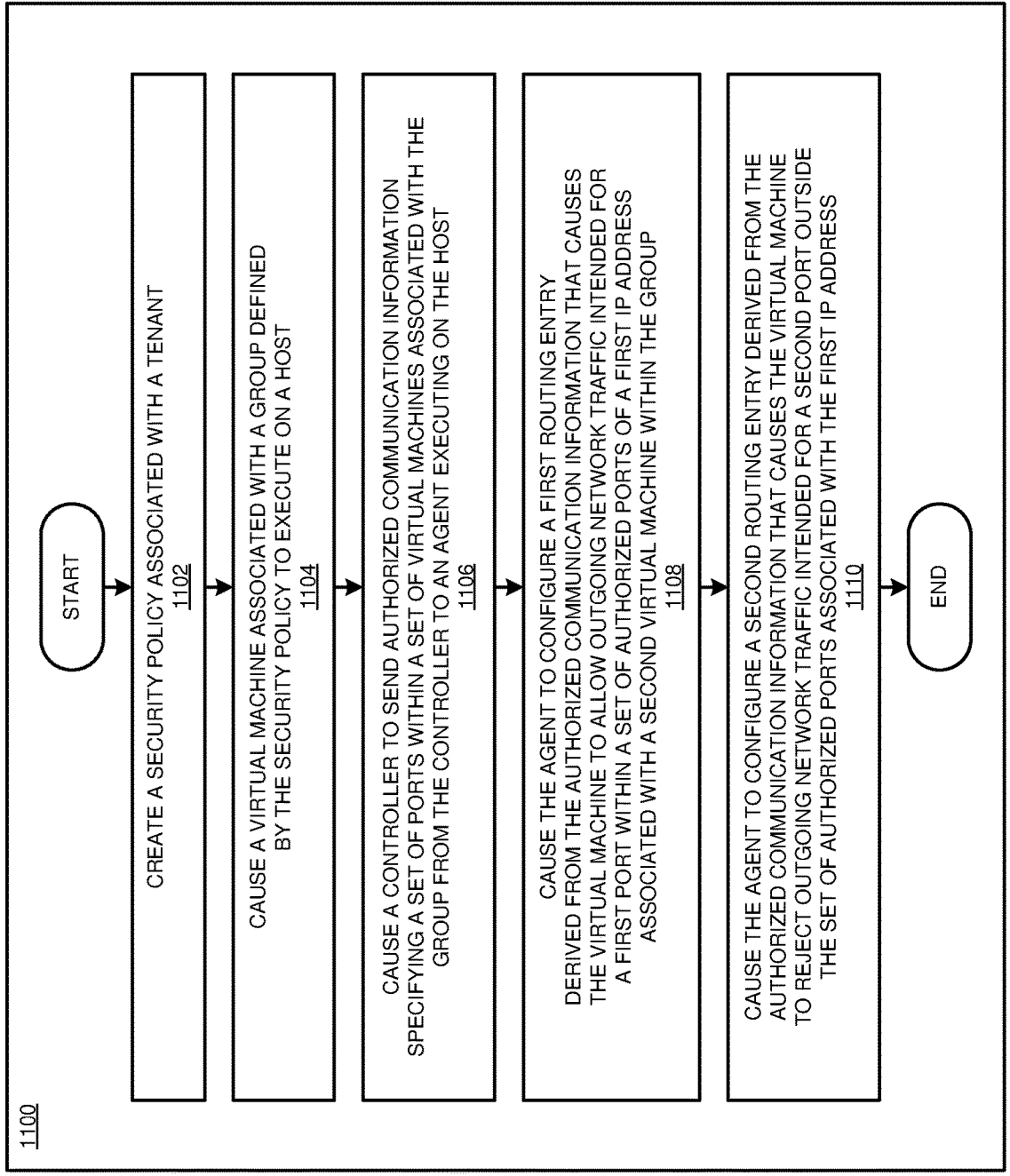
FIG. 11 depicts another flowchart of an example process for routing level access control for tenant virtual machines in a cloud networking environment in accordance with an illustrative embodiment.

With reference to FIG. 11, this figure depicts another flowchart of an example process for routing level access control for tenant virtual machines in a cloud networking environment in accordance with an illustrative embodiment. Process 1100 can be implemented in application 400 in FIG. 4.

In block 1102, the application creates a security policy associated with a tenant. In block 1104, the application causes a virtual machine associated with a group defined by the security policy to execute on a host. In block 1106, the application causes a controller to send authorized communication information specifying a set of ports within a set of virtual machines associated with the group from the controller to an agent executing on the host. In block 1108, the application causes the agent to configure a first routing entry, derived from the authorized communication information, in the host, vSwitch, physical switch, or virtual machine, that causes the virtual machine to allow outgoing network traffic intended for a first port within a set of authorized ports of a first IP address associated with a second virtual machine within the group, as permitted by the security policy. In block 1110, the application causes the agent to configure a second routing entry, derived from the authorized communication information, in the host, vSwitch, physical switch, or virtual machine, that causes the virtual machine to reject outgoing network traffic intended for a second port outside the set of authorized ports associated with the first IP address, as not permitted by the security policy. Then the application ends.

Thus, a computer implemented method, system or apparatus, and computer program product are provided in the illustrative embodiments for routing level access control for tenant virtual machines in a cloud networking environment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    creating a first security policy associated with a first tenant in a multi-tenant hosting data processing environment;
    causing a first virtual machine to execute on a first host, the first virtual machine associated with a first group defined by the first security policy;
    causing a controller to send, from the controller to an agent executing on the first host, authorized communication information, the authorized communication information specifying a set of virtual machines associated with the first group; and
    causing the agent to configure a first routing entry and a second routing entry in the first host, the first routing entry and the second routing entry derived from the authorized communication information, the first routing entry causing the first virtual machine to allow outgoing network traffic intended for a first IP address, the first IP address associated with a second virtual machine within the first group, the second routing entry causing the first virtual machine to reject all outgoing network traffic intended for any IP address unspecified in the first routing entry, the any IP address associated with a virtual machine outside the first group.

2. The method of claim 1, wherein the authorized communication information comprises the second routing entry.

3. The method of claim 1, further comprising:
    causing the agent to derive the second routing entry from the authorized communication information.

4. The method of claim 1, wherein the authorized communication information specifies a set of authorized ports associated with the set of virtual machines associated with the first group.

5. The method of claim 4, further comprising:
    causing the agent to configure a third routing entry in the first host, the third routing entry derived from the authorized communication information, the third routing entry causing the first virtual machine to allow outgoing network traffic intended for a first port at a third IP address, the first port within a set of authorized ports associated with the third IP address and the third IP address associated with a virtual machine within the first group.

6. The method of claim 5, wherein the authorized communication information comprises the third routing entry.

7. The method of claim 5, further comprising:
    causing the agent to derive the third routing entry from the authorized communication information.

8. The method of claim 4, further comprising:
    causing the agent to configure a fourth routing entry in the first host, the fourth routing entry derived from the authorized communication information, the fourth routing entry causing the first virtual machine to reject outgoing network traffic intended for a second port at a third IP address, the second port outside a set of authorized ports associated with the third IP address and the third IP address associated with a virtual machine within the first group.

9. A computer usable program product comprising one or more computer-readable storage devices, and program instructions stored on at least one of the one or more storage devices, the stored program instructions comprising:
    program instructions to create a first security policy associated with a first tenant in a multi-tenant hosting data processing environment;
    program instructions to cause a first virtual machine to execute on a first host, the first virtual machine associated with a first group defined by the first security policy;
    program instructions to cause a controller to send, from the controller to an agent executing on the first host, authorized communication information, the authorized communication information specifying a set of virtual machines associated with the first group; and
    program instructions to cause the agent to configure a first routing entry and a second routing entry in the first host, the first routing entry and the second routing entry derived from the authorized communication information, the first routing entry causing the first virtual machine to allow outgoing network traffic intended for a first IP address, the first IP address associated with a second virtual machine within the first group, the second routing entry causing the first virtual machine to reject all outgoing network traffic intended for any IP address unspecified in the first routing entry, the any IP address associated with a virtual machine outside the first group.

10. The computer usable program product of claim 9, wherein the authorized communication information comprises the second routing entry.

11. The computer usable program product of claim 9, further comprising:
program instructions to cause the agent to derive the second routing entry from the authorized communication information.

12. The computer usable program product of claim 9, wherein the authorized communication information specifies a set of authorized ports associated with the set of virtual machines associated with the first group.

13. The computer usable program product of claim 12, further comprising:
program instructions to cause the agent to configure a third routing entry in the first host, the third routing entry derived from the authorized communication information, the third routing entry causing the first virtual machine to allow outgoing network traffic intended for a first port at a third IP address, the first port within a set of authorized ports associated with the third IP address and the third IP address associated with a virtual machine within the first group.

14. The computer usable program product of claim 13, wherein the authorized communication information comprises the third routing entry.

15. The computer usable program product of claim 13, further comprising:
program instructions to cause the agent to derive the third routing entry from the authorized communication information.

16. The computer usable program product of claim 12, further comprising:
program instructions to cause the agent to configure a fourth routing entry in the first host, the fourth routing entry derived from the authorized communication information, the fourth routing entry causing the first virtual machine to reject outgoing network traffic intended for a second port at a third IP address, the second port outside a set of authorized ports associated with the third IP address and the third IP address associated with a virtual machine within the first group.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to create a first security policy associated with a first tenant in a multi-tenant hosting data processing environment;
program instructions to cause a first virtual machine to execute on a first host, the first virtual machine associated with a first group defined by the first security policy;
program instructions to cause a controller to send, from the controller to an agent executing on the first host, authorized communication information, the authorized communication information specifying a set of virtual machines associated with the first group; and
program instructions to cause the agent to configure a first routing entry and a second routing entry in the first host, the first routing entry and the second routing entry derived from the authorized communication information, the first routing entry causing the first virtual machine to allow outgoing network traffic intended for a first IP address, the first IP address associated with a second virtual machine within the first group, the second routing entry causing the first virtual machine to reject all outgoing network traffic intended for any IP address unspecified in the first routing entry, the any IP address associated with a virtual machine outside the first group.

* * * * *